United States Patent
Millet et al.

(10) Patent No.: US 8,713,370 B2
(45) Date of Patent: Apr. 29, 2014

(54) NON-INTRUSIVE PROCESSOR TRACING

(75) Inventors: Timothy J. Millet, Mountain View, CA (US); Shun Wai ("Dominic") Go, Cupertino, CA (US); Conrad H. Ziesler, Seattle, WA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 13/207,944

(22) Filed: Aug. 11, 2011

(65) Prior Publication Data

US 2013/0042155 A1    Feb. 14, 2013

(51) Int. Cl.
  *G06F 11/00* (2006.01)
(52) U.S. Cl.
  USPC .................................. 714/30; 714/27; 714/45
(58) Field of Classification Search
  USPC .............. 714/25, 27, 30, 34, 37, 38.1, 45
  See application file for complete search history.

(56) References Cited

U.S. PATENT DOCUMENTS

| | | |
|---|---|---|
| 5,848,264 A | 12/1998 | Baird et al. |
| 6,314,530 B1 | 11/2001 | Mann |
| 6,684,348 B1 | 1/2004 | Edwards et al. |
| 7,143,205 B2 * | 11/2006 | Sakugawa ........................ 714/45 |
| 7,707,395 B2 | 4/2010 | Das |
| 2005/0188144 A1 * | 8/2005 | Park et al. ...................... 710/315 |
| 2005/0193256 A1 * | 9/2005 | Moyer ........................ 714/30 |
| 2007/0204137 A1 * | 8/2007 | Tran .............................. 712/214 |
| 2007/0220361 A1 | 9/2007 | Barnum et al. |
| 2008/0250275 A1 * | 10/2008 | Walker et al. .................... 714/45 |
| 2009/0249127 A1 * | 10/2009 | Deleris ........................... 714/45 |

\* cited by examiner

*Primary Examiner* — Joseph D Manoskey
(74) *Attorney, Agent, or Firm* — Rory D. Rankin; Meyertons, Hood, Kivlin, Kowert & Goetzel, P.C.

(57) ABSTRACT

A system, apparatus, and method for writing trace data to storage. Trace data is captured from one or more processors, and then the trace data is written to a trace buffer. The trace data includes program counters of instructions executed by the processors and other debug data. A direct memory access (DMA) controller in a non-real-time block of the system reads trace data from the trace buffer and then writes the trace data to memory via a non-real-time port of a memory controller.

21 Claims, 9 Drawing Sheets

Data Packet Format

| 0 | 1:31 | |
|---|---|---|
| 0 | trnc | PC[32:61] |
| 1 | PC[0:30] | |
| 1 | PC[31:61] | |
| 0 | ASID | |

FIG. 6

NON-INTRUSIVE PROCESSOR TRACING

BACKGROUND

1. Field of the Invention

The present invention relates generally to processors, and in particular to capturing and storing processor trace data.

2. Description of the Related Art

Methods and mechanisms have been developed to accumulate debugging information for processors within a system on chip (SoC). Typically, the processors execute programs that interact with other devices within a SoC. A program may comprise one or more instruction sequences, which can include branches within the sequences, branches to other sequences, etc. Each instruction may be identified by an address, or PC, which locates the instruction in memory (indirectly, when address translation is enabled).

During development of the SoC and programs to execute on the SoC, various debugging aids can be useful. For example, the stream of PCs executed by the processor may be useful to determine the program flow. Both functional problem diagnoses (traditional debugging) and performance problem diagnoses (e.g., determining why performance is lower than expected) can benefit from having access to the stream of PCs executed by the processor. The stream of PCs may also be referred to as trace data or PC trace data. Oftentimes, the trace data may be stored temporarily in a small buffer before being written to memory.

As the complexity of the processors and the SoC including the processors increases (superscalar design, multiple cores per chip, etc.), the number of PCs per clock cycle increases. As a result, the amount of trace data captured in real time expands dramatically, and the trace buffer may fill up rapidly and need to be written to memory on a frequent basis. Accordingly, the dumping of the trace buffer to memory may interfere with the operation of the processors, which may change the way the processors behave when tracing is enabled versus when tracing is not enabled.

SUMMARY

In one embodiment, an apparatus may include one or more processors, a bus interface unit (BIU), a memory controller, and a non-real-time (NRT) block. The BIU may include one or more trace buffers, and the processor(s) may write trace data to the trace buffers. The trace data may include program counters of retired instructions, branches, exceptions, interrupts, and the amount of time elapsed between events. Other sources may also write trace data to the trace buffers, and the trace data from the various sources may be interleaved within the trace buffers.

The NRT block may include a direct memory access (DMA) controller, and the DMA controller may read the data out of the trace buffers. Then, the DMA controller may write the trace data to memory via a memory controller. The DMA controller may be coupled to the memory controller via a NRT port. The processors may also be coupled to the memory controller via a real-time (RT) port. The separation of the processor traffic and trace data traffic on two separate ports of the memory controller may minimize the interference between the separate traffic and may allow trace data to be written to memory without affecting the performance of the processor(s).

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 is a block diagram of one embodiment of a data packet format from a processor.

DETAILED DESCRIPTION OF EMBODIMENTS

Figure 1:
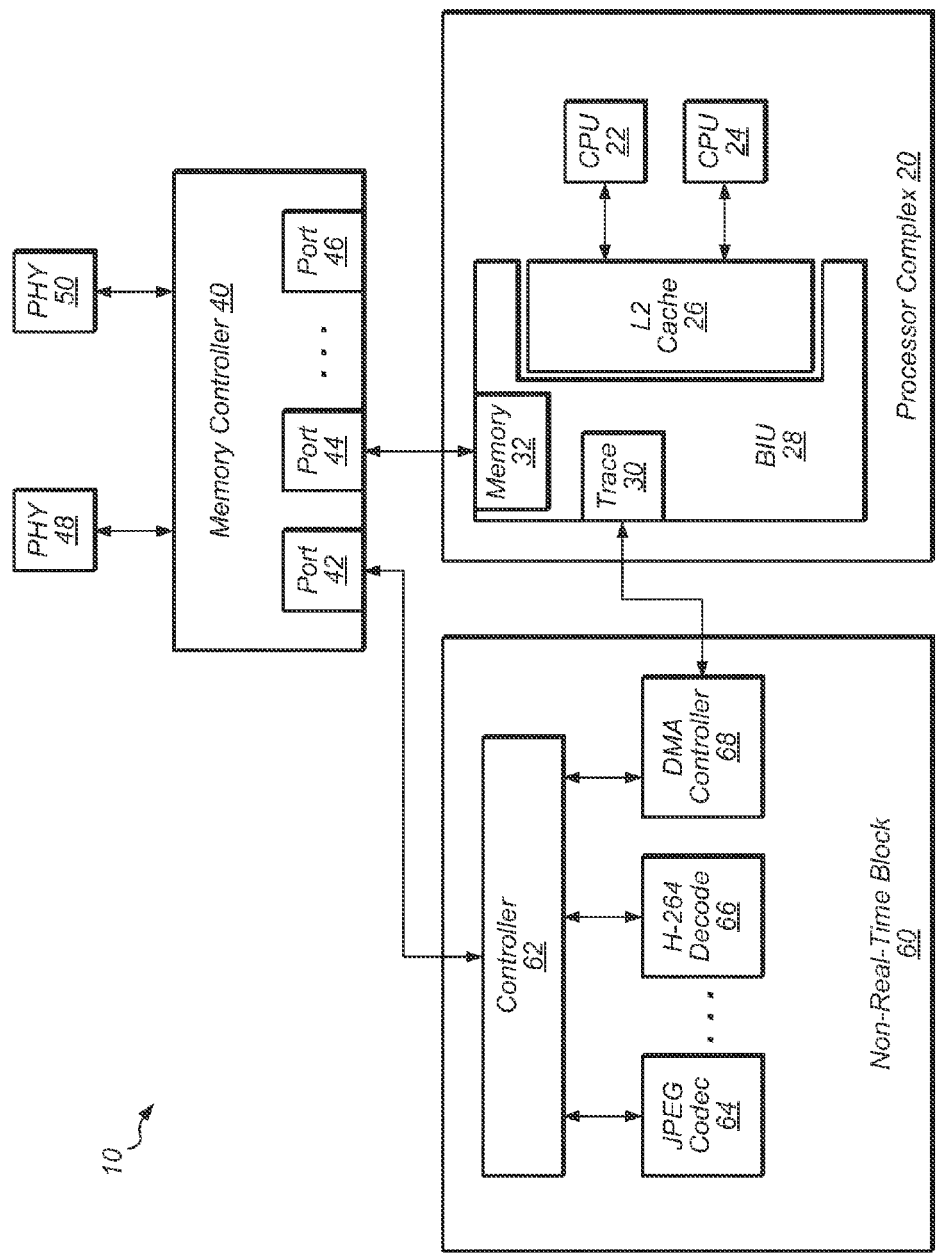
FIG. 1 is a block diagram that illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . ." Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

Referring now to FIG. 1, a block diagram illustrating one embodiment of a portion of an integrated circuit (IC) is shown. In the illustrated embodiment, IC 10 includes a processor complex 20, memory controller 40, memory physical interface circuits (PHYs) 48 and 50, and non-real-time (NRT) block 60. It is noted that IC 10 may also include many other components not shown in FIG. 1. In various embodiments, IC 10 may also be referred to as a system on chip (SoC) or an application specific integrated circuit (ASIC).

Processor complex 20 may include central processing units (CPUs) 22 and 24, level 2 (L2) cache 26, and bus interface unit (BIU) 28. In other embodiments, processor complex 20 may include other numbers of CPUs. It is noted that CPUs 22 and 24 may also be referred to as processors or cores. BIU 28 may include a trace port 30 and memory port 32. CPUs 22 and 24 may be coupled to L2 cache 26, and L2 cache 26 may be coupled to BIU 28. Other embodiments may not include L2 cache 26 and/or may include additional levels of cache. BIU 28 may also include other components not shown in FIG. 1.

In one embodiment, L2 cache 26 may be configured to cache instructions and data for low latency access by CPUs 22 and 24. The L2 cache 26 may comprise any capacity and configuration (e.g. direct mapped, set associative). In one embodiment, L2 cache 26 may be configured as a set-associative, writeback cache that is fully inclusive of caches within CPUs 22 and 24. In various embodiments, L2 cache 26 may include a variety of structures configured to support cache functionality and performance. For example, L2 cache 26 may include a miss buffer configured to store requests that miss the L2, a fill buffer configured to temporarily store data, a writeback buffer configured to temporarily store dirty evicted data and snoop copyback data, and/or a snoop buffer configured to store snoop requests. In some embodiments, L2 cache 26 may include a crossbar (not shown) for managing data flow between L2 cache 26 and BIU 28 and between L2 cache 26 and CPUs 22 and 24. In various embodiments, L2 cache 26 may implement arbitration logic to prioritize cache access among various cache read and write requestors. Other variations of L2 cache 26 configurations are possible and contemplated. L2 cache 26 may be coupled to memory controller 40 via memory port 32 for cache-coherent memory requests.

As shown in FIG. 1, BIU 28 includes trace unit 30, and trace unit 30 may include logic for capturing, forwarding, multiplexing, interleaving, and storing trace data from multiple sources in one or more trace buffers (not shown). Additionally, trace unit 30 may be coupled to DMA controller 68 of NRT Block 60 via a port dedicated for trace data traffic. DMA controller 68 may be configured to read trace data out of trace unit 30. In one embodiment, trace data read out of trace unit 30 may not be checked against or pass through the L2 cache 26, and thus the trace data may be non-coherent. BIU 28 may also include various other logic structures to couple CPUs 22 and 24 and L2 cache 26 to various devices and blocks.

Trace unit 30 may be configured to capture and store trace records from CPUs 22 and 24 in one or more trace buffers. As used herein, a trace record may comprise data that is captured with regard to an underlying activity or value. The trace record may be a direct copy of the underlying activity/value, or may indirectly specify the activity/value in cooperation with other trace records. For example, program counter (PC) trace records may trace the PCs of instructions executed by CPUs 22 and 24. An initial PC record (referred to as a start PC record herein) may indicate that a trace is being started and may include one or more corresponding data records the capture the start PC. Subsequent records (retire records) may indicate the number of instructions retired in a given clock cycle, and may identify taken branches. If instructions are being successfully retired without taken branches, the count of retired instructions may be used with the start PC to generate additional PCs. If a taken branch is identified, the program code can be searched to identify the target PC (e.g., for relative branches) or the retire record may include one or more corresponding data records that capture the target PC (e.g., for indirect branches).

The CPUs 22 and 24 may include circuitry to execute instructions defined in an instruction set architecture. Specifically, one or more programs comprising the instructions may be executed by the CPUs 22 and 24. Any instruction set architecture may be implemented in various embodiments. For example, in one embodiment, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

Memory controller 40 includes ports 42, 44, and 46, which are representative of any number of ports. Port 42 may be coupled to controller 62 of NRT block 60. In one embodiment, port 42 may be designated to transmit and receive NRT memory requests or transactions. Port 44 may be coupled to memory port 32 of BIU 28 in processor complex 20. Port 46 may be coupled to another block (not shown) of IC 10. For example, in one embodiment, port 46 may be coupled to a real-time (RT) peripheral block (not shown). In another embodiment, port 46 may be coupled to a graphics controller (not shown). Generally speaking, NRT memory requests may be treated as a lower priority than RT memory requests by memory controller 40.

The memory controller 40 may include circuitry configured to interface to memory. For example, the memory controller 40 may be configured to interface to dynamic random access memory (DRAM) such as synchronous DRAM (SDRAM), double data rate (DDR) SDRAM, DDR2 SDRAM, Rambus DRAM (RDRAM), etc. The memory controller 40 may receive read and write transactions from processor complex 20, NRT block 60, and other blocks for the memory devices (not shown), and memory controller 40 may perform the read and write operations to the memory. Memory controller 40 may also be coupled to memory physical interface circuits (PHYs) 48 and 50. Memory PHYs 48 and 50 are representative of any number of memory PHYs which may be coupled to memory controller 40. The memory PHYs 48 and 50 may be configured to interface to memories (not shown).

NRT block 60 may include JPEG codec block 64, H-264 decode block 66, DMA controller 68, and various other blocks. These blocks may be coupled to controller 62, and controller 62 may be coupled to port 42 of memory controller 40. Controller 62 may provide access to memory (via memory controller 40) for the various components and blocks of NRT block 60.

Figure 2:
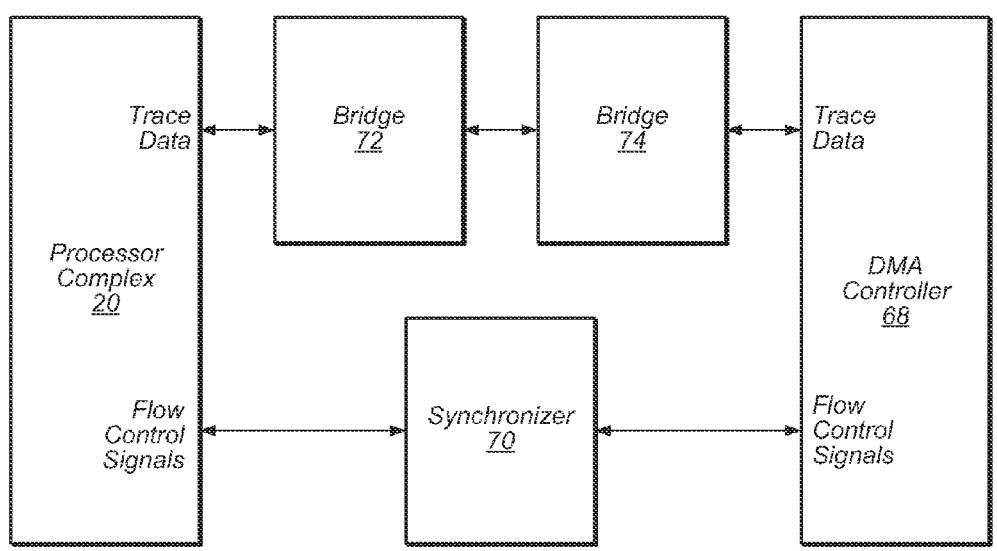
FIG. 2 is a block diagram that illustrates one embodiment of an interface for coupling trace data between a processor complex and a direct memory access controller.

Turning now to FIG. 2, a block diagram of one embodiment of an interface between a processor complex and DMA controller is shown. Processor complex 20 may be coupled to bridge 72 and synchronizer 70. Bridge 72 may be coupled to bridge 74, and bridge 74 may be coupled to DMA controller 68. Bridges 72 and 74 may be utilized to translate between different protocols, and also may be utilized to isolate clock domains between processor complex 20 and DMA controller 68. Synchronizer 70 may be utilized to convey requests, acknowledgements, terminal counts, and various other flow control signals between processor complex 20 and DMA controller 68.

For example, in one embodiment, the processor complex 20 may utilize an advanced peripheral bus (APB) interface for communicating with the DMA controller 68. DMA controller 68 may utilize an advanced high-performance bus (AHB) interface for communicating with the processor complex 20. In such an embodiment, bridge 72 may be an asynchronous APB to APB bridge and bridge 74 may be an AHB to APB bridge. In other embodiments, various other protocols and bus interfaces may be utilized. Also, in various embodiments, various numbers of bridges and synchronizers may be utilized between processor complex 20 and DMA controller 68.

Figure 3:
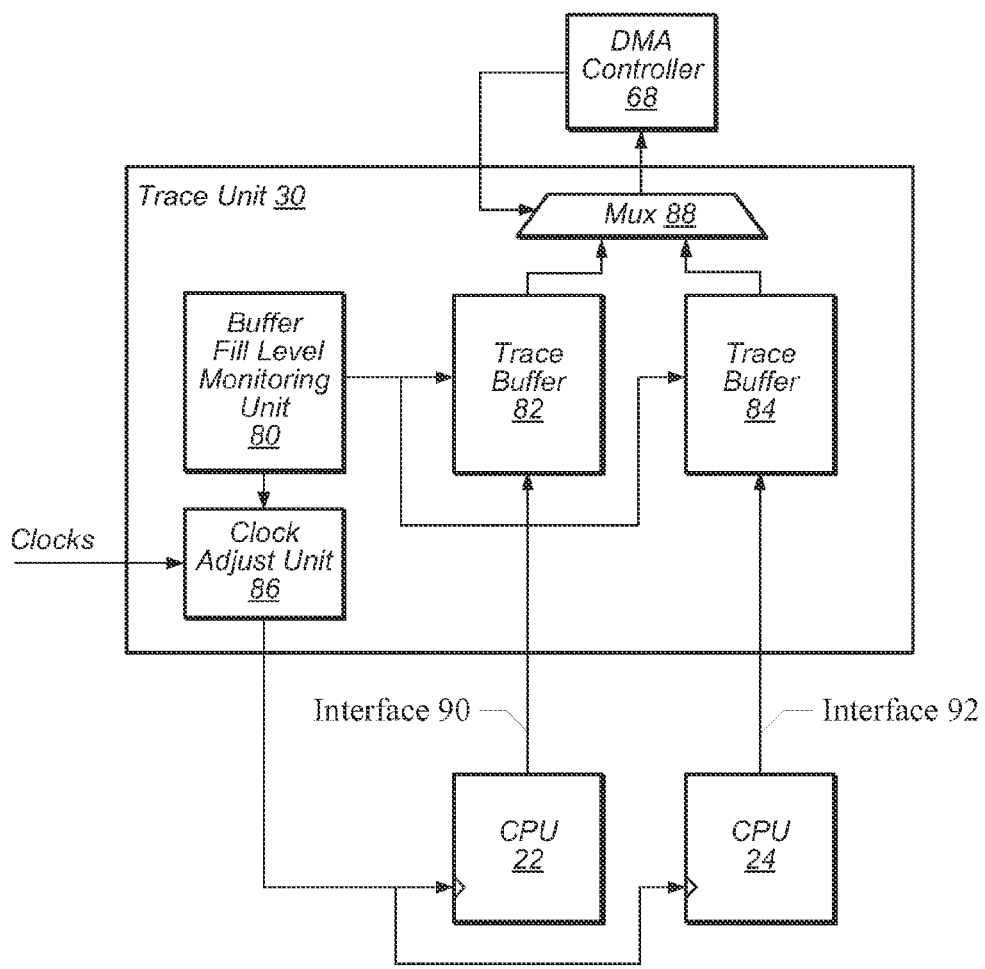
FIG. 3 is a block diagram that illustrates one embodiment of a trace unit.

Referring now to FIG. 3, a block diagram of a portion of an integrated circuit for capturing trace data in accordance with one or more embodiments is shown. Trace unit 30 is shown in FIG. 3, and trace unit 30 is coupled to direct memory access (DMA) controller 68. Trace unit 30 is also coupled to CPUs 22 and 24 via interfaces 90 and 92, respectively. Trace unit 30 may also receive one or more clocks, and the clocks may also be coupled to clock adjust unit 86. The one or more clocks may be coupled to CPUs 22 and 24 after passing through clock adjust unit 86. During normal operating conditions, clock adjust unit 86 may pass through the input clocks without modifying their frequencies. It is noted that IC 10 may include various other components not shown in FIG. 3.

The trace buffers 82 and 84 may be coupled to receive packets of PC trace records from the CPUs 22 and 24, respectively, via interfaces 90 and 92. Interface 90 is shown in more detail in FIG. 4. In one embodiment, at most one packet may be transmitted per clock cycle from each CPU 22 and 24, and thus the channel for transmitting the packets may be the same width as a packet. In one implementation, a packet is 32 bits wide and thus the channel is 32 bits wide. Other implementations may implement wider or narrower packets, and the channel width may or may not match the width of a PC trace record (or a multiple thereof, permitting more than one packet to be transferred per clock cycle). In addition to the packet, there may be one or more control signals that indicate the type of packet (e.g., control records or data records). In some embodiments, each of the CPUs 22 and 24 may also provide a control signal to the trace buffers 82 and 84, respectively, to indicate that a valid packet is being transmitted.

DMA controller 68 may select to read from either trace buffer 82 or 84 via multiplexer 88. In other embodiments, trace unit 30 may include other numbers of trace buffers, and DMA controller 68 may be configured to select from each of the trace buffers through multiplexer 88. DMA controller 68 may write the data received from trace buffers 82 and 84 to memory (not shown) via a memory controller (not shown). In one embodiment, trace buffers 82 and 84 may be RAMs, although any memory type may be used.

Trace unit 30 may also include buffer fill level monitoring unit 80, and unit 80 may be configured to monitor the amount of data in trace buffers 82 and 84 in relation to one or more thresholds. In one embodiment, the amount of data in either trace buffer 82 or trace buffer 84 may be compared to the one or more thresholds. In another embodiment, the total amount of data in both trace buffers 82 and 84 may be compared to the one or more thresholds.

In one embodiment, in response to detecting a high threshold has been exceeded in one or more buffers, unit 80 may notify the clock adjust unit 86. The high threshold may be fixed or programmable, in various embodiments. In response to receiving the notification from unit 80, the unit 86 may reduce the frequency of the input clocks before passing the clocks to CPUs 22 and 24. In some embodiments, the unit 86 may reduce the clock frequency to zero (i.e., turn off the clocks). It is noted that in various embodiments, CPUs 22 and 24 may have separate clocks, and the frequency of the separate clocks may be adjusted separately by unit 86. For example, in one embodiment, trace buffer 82 may have exceeded a high threshold and trace buffer 84 may not have exceeded the high threshold. Therefore, the one or more input clock frequencies of CPU 22 may be reduced while the one or more input clock frequencies of CPU 24 may remain unchanged. Variations of adjusting the clock frequencies of the one or more CPUs separately or jointly are possible and are contemplated. In another embodiment, unit 80 and unit 86 may be combined into a single unit. Also, in a further embodiment, unit 80 and/or 86 may be located outside of trace unit 30.

The reduction of the input clocks to CPUs 22 and 24 may have the effect of reducing the rate at which trace data is written to trace buffers 82 and 84. Therefore, this may allow the DMA controller 68 to read data out of the trace buffers faster than data is being written in, and the amount of data waiting in the trace buffers may be reduced. In various embodiments, DMA controller 68 may read data out of trace buffers 82 and 84 at a slower rate than CPUs 22 and 24 are capable of writing trace data into trace buffers 82 and 84. Therefore, a reduction in the clock frequency may allow DMA controller 68 to approach or exceed the rate at which CPUs 22 and 24 write data to the buffers. This may prevent an overflow of trace buffers 82 and 84.

While the frequencies of the input clocks to the CPUs 22 and 24 are reduced, the DMA controller 68 may continue to read out data at a constant rate and the amount of data stored in the trace buffers 82 and 84 may be reduced. Eventually, the amount of data may fall below a low threshold. The unit 80 may continue to monitor the fill level of the trace buffers while the clock frequencies have been reduced. When unit 80 detects that the fill level of trace buffers 82 and/or 84 have fallen below the low threshold, then unit 80 may notify clock adjust unit 86, and the corresponding clock frequencies may be increased.

Figure 4:
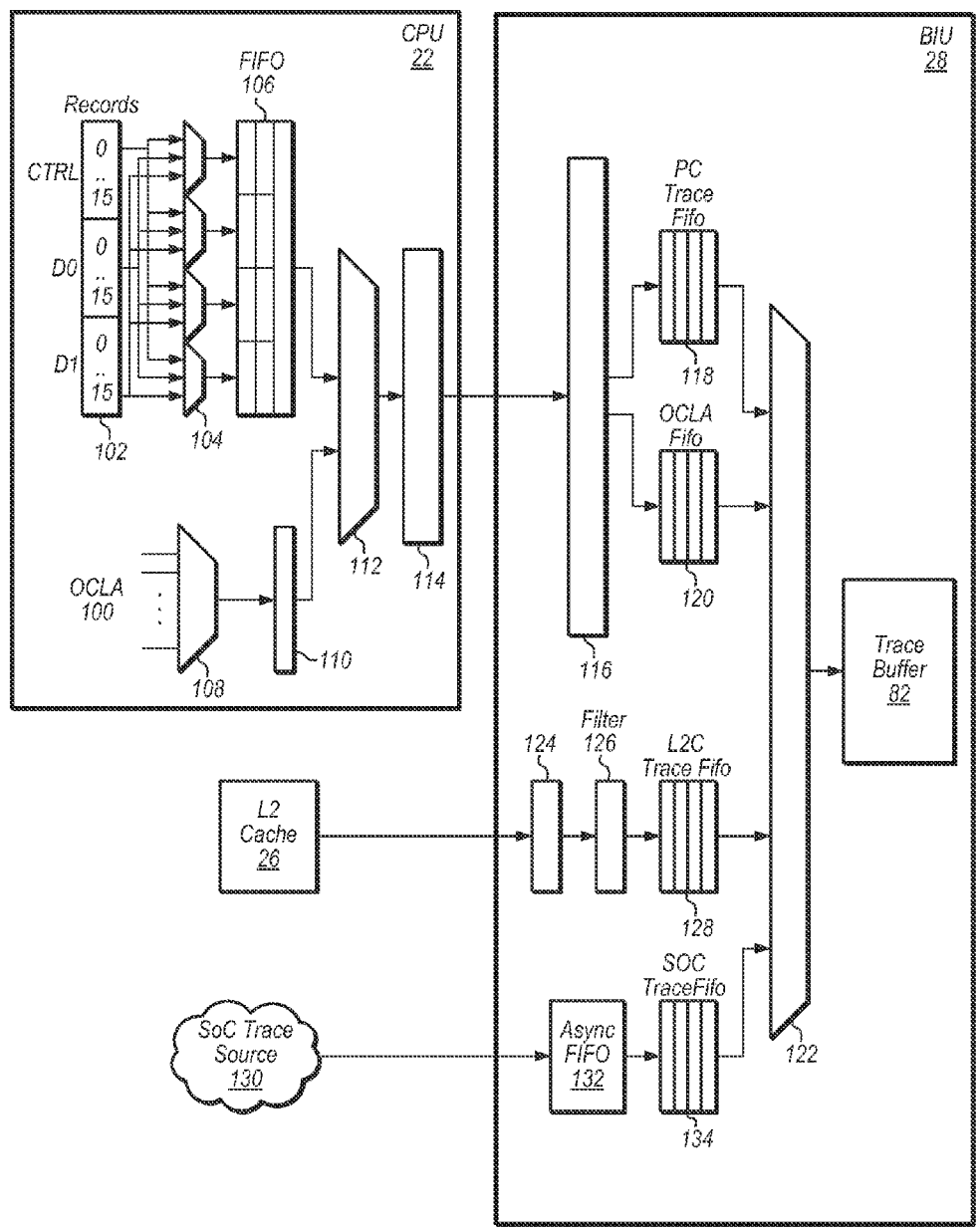
FIG. 4 is a block diagram of circuit logic for capturing trace data in accordance with one or more embodiments.

Turning now to FIG. 4, a block diagram of circuit logic for capturing trace data is shown. The trace data captured from CPU 22 may be stored in trace buffer 82. The trace data may be coupled from CPU 22 to trace buffer 82 via the path shown in FIG. 4. Trace data captured from CPU 24 may be coupled to trace buffer 84 in a similar manner to that shown in FIG. 4.

CPU 22 may generate trace data and the trace data may be organized into control (CTRL) and data (D0, D1) records in block 102. When CPU 22 retires instructions at the end of its execution pipeline, the program counters (PCs) of the retired instructions may be logged as trace data. The trace data may also include the PCs of branches, exceptions, interrupts, and other data. The various records of trace data may be multiplexed through the set of multiplexers 104, and then the records may be stored in first-in first-out queue (FIFO) 106. The output of FIFO 106 may be coupled to the input of multiplexer 112.

Various internal signals within CPU 22 may be probed with the on-chip logic analyzer (OCLA) 100, and the sampled data captured from these signals may be coupled to multiplexer 108. The output of multiplexer 108 may be coupled to buffer 110, and the output of buffer 110 may be coupled to an input of multiplexer 112. The output of multiplexer 112 may be coupled to repeater 114, and repeater 114 may be coupled to buffer 116 within BIU 28. Buffer 116 may be coupled to FIFO 118 for PC trace data and buffer 116 may be coupled to FIFO 120 for OCLA 100 data. The outputs of FIFO 118 and FIFO 120 may be coupled to inputs of multiplexer 122.

L2 cache 26 may generate or pass along various trace or other debug data from other sources, and this data may be coupled to repeater 124. The output of repeater 124 may be coupled to filter 126, and the output of filter 126 may be coupled to FIFO 128. The output of FIFO 128 may be coupled to an input of multiplexer 122. Additionally, SoC trace source 130 may be coupled to asynchronous FIFO 132. Asynchronous FIFO 132 may be utilized to isolated clock domains between SoC trace source 130 and BIU 28. In various embodiments, SoC trace source 130 may be any number of various components or signals within IC 10 that generate trace or debug data. FIFO 132 may be coupled to SoC Trace FIFO 134, and SoC Trace FIFO 134 may be coupled to an input of multiplexer 122. The output of multiplexer 122 may be coupled to trace buffer 82.

The trace data from CPU 22, OCLA 100, L2 cache 26, and SoC trace source 130 may be interleaved within trace buffer 82. In one embodiment, the trace buffer 82 may be of size 256 by 128 bits. In other embodiments, the trace buffer 82 may be various other sizes. In one embodiment, the trace buffer 82 may be configured as a FIFO queue. In another embodiment, the trace buffer 82 may be configured as a circular buffer, and thus data within the trace buffer 82 may be overwritten.

It is noted that in other embodiments, the connections and logic of CPU 22 and BIU 28 may be different than the configuration shown in FIG. 4. For example, some of the components, such as repeaters, FIFOs, buffers, and multiplexers may be replaced or omitted, and other components added. Variations of the connections and logic between the CPU 22 and trace buffer 82 are possible and are contemplated.

Figure 5:
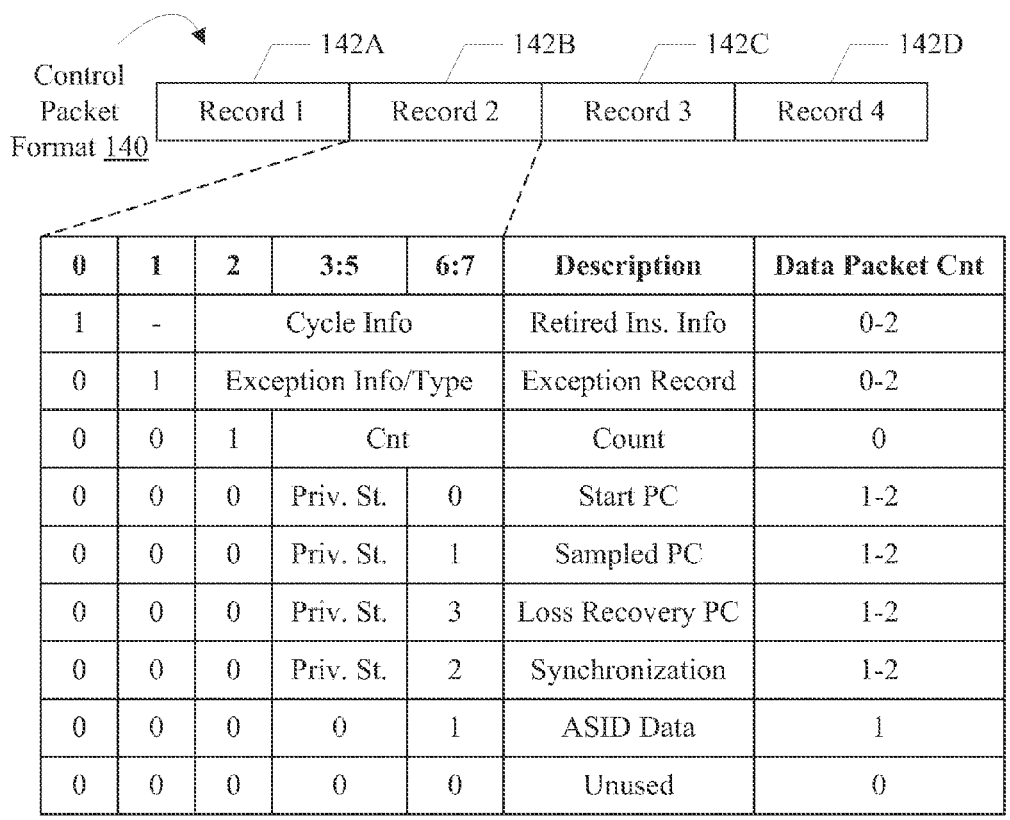
FIG. 5 is a block diagram of one embodiment of a control packet format from a processor.

Turning now to FIG. 5, one embodiment of a control packet format 140 that may be generated by the CPUs 22 and 24 is shown. A control packet may include multiple control records 142A-D. Specifically, each control record 142A-D may comprise one byte (8 bits) and thus the control packet may be 4 bytes (32 bits). Other sizes of control records and/or packets may be used in other embodiments.

The control record 142B is shown in exploded form in FIG. 5, with a table of the supported records for one embodiment. The table includes the bits of the control record, along with a description of the record and a count of data packets that may be associated with that control packet.

As illustrated, if bit zero of the control record is set, the record is a retired instruction information record (or, more briefly, a retire record). The retire record is generated during tracing, and indicates that one or more instructions were retired in a clock cycle. The cycle info field provides information about the instructions. In one embodiment, the cycle info field may include two bits encoding the number of instructions that were retired. The instruction count may indicate one to four instructions, with the value of zero in the count indicating four. The cycle info field may further include a bit field indicating which instructions, in program order, were taken branch instructions and which were other instructions. For example, a set bit in the bit field may indicate taken branch and a clear bit may indicate other instructions.

The retire record may have zero to two associated data packets. If the retired instruction information record indicates no taken branches, or if the taken branches are direct branches (i.e., not indirect branches), then there are zero associated data packets. A PC is not needed for non-taken branch instructions, since the PC can be generated from the PC of the preceding instruction. If the instruction is a direct taken branch (e.g., relative branches, absolute branches), the PC can be derived from the offset in the branch instruction itself, and can be obtained by a post processor reading the program file. If a taken branch is indirect, one to two data packets may be used to provide the target PC. In one embodiment, no more than one indirect branch may be retired per clock cycle so that only one target PC need be captured. Other embodiments may capture multiple target PCs and thus may associate additional data records with the retire record to capture the additional target PCs.

If bit zero of the control record is clear and bit one is set, the record is an exception record that indicates an exception has occurred. The exception info/type field may provide information about the exception. In one embodiment, two exception records may be generated for an exception, and the exception info/type field may be interpreted differently for the two records, giving 12 bits of exception info/type. The type may identify the specific exception, and the info may provide information related to the type of instruction on which the exception was detected, the value of certain machine state register bits, etc. The exception record may include zero to two data packets to capture the PC of the instruction for which the exception was detected and/or the PC to which the exception vectors.

If bits zero and one of the control record are clear and bit two is set, the record is a count record. The count record may comprise a number of consecutive clock cycles (in the Cnt field) for which no control records are generated. The count record has no associated data packets.

The remaining records are identified with bits zero, one, and two of the control record clear. The remaining five bits are coded as shown in FIG. 5. Except for the address space identifier (ASID) data record (and the unused record), the remaining records each have one to two associated data packets that comprise the PC. Additionally, for each of the PC records (the remaining records except for the ASID data record), the privilege state of the processor may be recorded (Priv. St. in FIG. 5). The privilege state may be encoded as various non-zero values of the Priv. St. field, so the ASID data record may be identified via a zero value in bits 3:5. Other non-PC records may also be defined using zero in bits 3:5 and other values of bits 6:7. The number of privilege states and their encodings may vary from embodiment to embodiment, dependent at least in part on the instruction set architecture implemented by the CPUs 22 and 24. The encoding of all zeros is reserved as unused in this embodiment. The unused encoding may be written, for example, when flushing a partial control packet to a respective trace buffer.

The start PC record records the initial PC of the trace. Tracing may be started according to a trigger event, and the start PC may be the PC of the instruction for which the trigger is detected. The sampled PC record may be used to indicate a PC that is near a given instruction, if the PC trace is being filtered for certain instructions. The loss recovery PC record is used to provide a PC when one or more control records are lost, for lossy tracing modes. The synchronization record provides a periodic PC if synchronization is enabled for the trace. That is, every N cycles or instructions (or some other periodic measure), a synchronization PC is recorded to provide points of reference for the post processor software in cases in which loss occurs.

The ASID data record may be generated by a CPU if software writes a specified ASID data register, defined to cause ASID data to be written to the trace. The ASID may serve as a sort of process identifier, and may be used by software to indicate context switches and/or privilege level changes in the trace.

Referring now to FIG. 6, a block diagram of one embodiment of a data packet format is shown. In one embodiment, PCs may be either 32 bits or 64 bits, depending on the operating mode of the CPU. For one embodiment, for a CPU implementing the PowerPC instruction set architecture, instructions are 4 bytes long and thus the least significant two bits are zero and need not be recorded. Bit zero of the data packet may be clear to indicate a 32 bit PC and set to indicate each packet of a 64 bit PC. For the 32 bit PC, a truncation indication (trnc) indicates whether or not the 32 bit PC is truncated. The 32 bit PC is truncated if at least one non-recorded bit (bits 0:31 of the PC) is non-zero. The ASID may also be included in a data packet, with bit zero of the data packet clear, for the ASID data record shown in FIG. 5. Accordingly, for the embodiment of FIG. 6, a data record may comprise one or two data packets.

Figure 7:
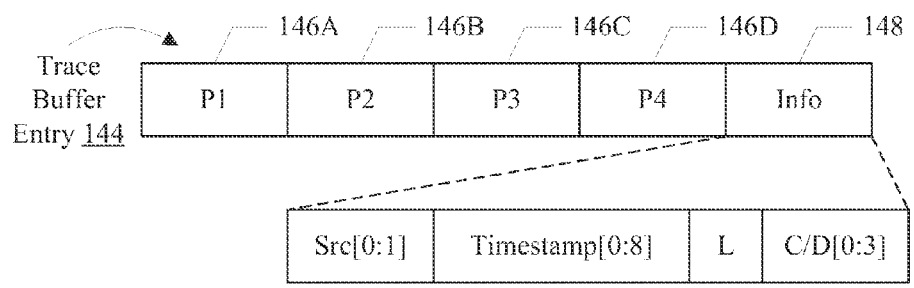
FIG. 7 is a block diagram of one embodiment of a trace buffer entry.

Turning now to FIG. 7, a block diagram of one embodiment of a trace buffer entry is shown. In the illustrated embodiment, up to four packets 146A-D may be stored in an entry. In other embodiments, more or fewer packets may be stored in an entry, including one packet per entry.

In addition to the packets, an information field 148 is stored in the entry. The information field includes a source indication (e.g. Src[0:1], in one embodiment), a timestamp field (Timestamp[0:8], in one embodiment), a loss indicator (L) and a control/data field (C/D[0:3]). The source indication may identify the source of the packets in the entry. Thus, packets from different sources (which may be interleaved in the trace buffers 82 and 84) can be identified. Specifically, different encodings of the source indication may be assigned to each CPU 22 and 24 and to the other sources of trace data. The timestamp field may provide an indication of time, so that the time at which different entries were written can be discerned. The timestamp may be relative to the start of tracing, for example, or relative to the last record written in the trace.

The remaining fields of the information field 148 may be specific to PC tracing. Other definitions of the remaining fields may be used for other trace records. The loss indication (L) may indication whether or not a loss of PC trace records has been detected. Specifically, the loss indication may indicate that one or more records were not written to a trace buffer due to contention with other records. The CPU 22 or 24 for which the record was dropped may be informed, and the respective CPU may generate a loss recovery PC record. The control/data field (C/D[0:3]) may comprise a bit for each packet indicating whether the packet is a control packet (bit set) or data packet (bit clear).

The embodiment of FIG. 7 illustrates four packets per trace buffer entry 144. The four packets may be accumulated in various fashions. For example, storage may be provided before the multiplexer 122 (of FIG. 4) to accumulate up to four packets before writing to trace buffer 82. Alternatively, an entry may be allocated when the first packet is written, and the trace buffer 82 may track the allocated entry to write up to three more packets from the same source to the entry. In other embodiments, packets from different sources may be written to the same entry.

Figure 8:
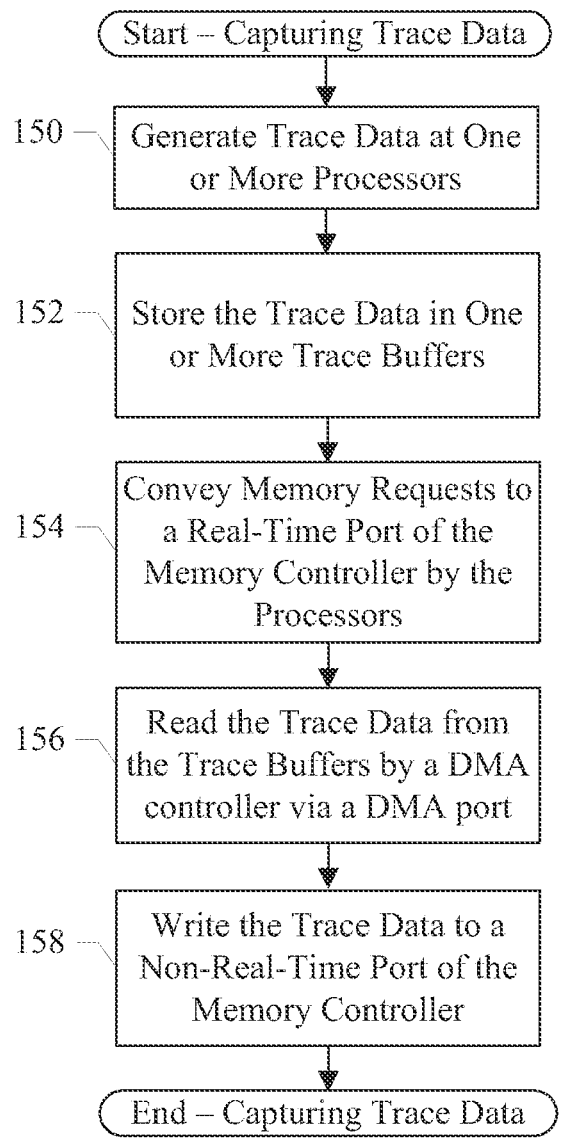
FIG. 8 is a generalized flow diagram illustrating one embodiment of a method for capturing trace data.

Referring now to FIG. 8, one embodiment of a method for capturing trace data is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Trace data may be generated at one or more processors (block 150). The trace data may include PCs of retired instructions, branches, exceptions, interrupts, the amount of time elapsed between events, and other data. The trace data may be stored in one or more trace buffers (block 152). In one embodiment, there may be a separate trace buffer for each processor. The processor(s) may convey memory requests to the memory controller via a real-time port (block 154). These memory requests may correspond to the normal execution of programs by the processor(s).

The trace data stored in the trace buffers may be read from the trace buffers by a DMA controller via a DMA port (block 156). In one embodiment, the DMA controller may select among the trace buffers via a multiplexer. The DMA controller may write the trace data to a non-real-time port of the memory controller (158). The DMA controller may be located in a non-real-time block of the SoC, and DMA transfers of trace data may not stress the main interface used by the processor for accessing memory. The memory controller may also receive memory requests from the one or more processors on a real-time port of the memory controller. The data received on the non-real-time port of the memory controller may have a minimal effect on the servicing of the memory requests received on the real-time port. This may ensure that the capturing and storing of trace data will not impact the operation of the one or more processors, and therefore, operation of the processors may behave in a consistent manner whether or not trace data is being collected.

In another embodiment, internal signal data from the processors may be captured using an on-chip logic analyzer (OCLA). The internal signal data may be interleaved and stored in the trace buffers, and then the DMA controller may read the trace and internal signal data from the trace buffers and write this data to memory. In a further embodiment, additional data from other sources may be interleaved with the trace and OCLA data in the trace buffers.

Figure 9:
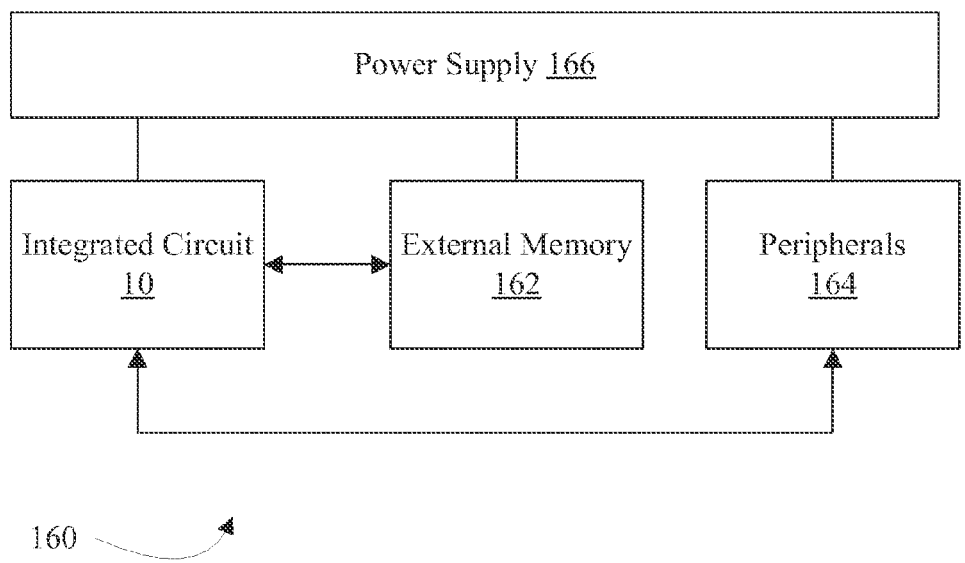
FIG. 9 is a block diagram illustrating one embodiment of a system including a processor.

Turning next to FIG. 9, a block diagram of one embodiment of a system 160 is shown. In the illustrated embodiment, the system 160 includes at least one instance of the integrated circuit 10 coupled to external memory 162. The integrated circuit 10 is coupled to one or more peripherals 164 and the external memory 162. A power supply 166 is also provided which supplies the supply voltages as well as one or more supply voltages to the integrated circuit 10, memory 162, and/or the peripherals 164. In other embodiments, more than one power supply 166 may be provided. In some embodiments, more than one instance of the integrated circuit 10 may be included (and more than one external memory 162 may be included as well).

The peripherals 164 may include any desired circuitry, depending on the type of system 160. For example, in one embodiment, the system 160 may be a mobile device (e.g., personal digital assistant (PDA), smart phone, electronic reading device) and the peripherals 164 may include devices for various types of wireless communication, such as Wi-Fi, Bluetooth, cellular, global positioning system, etc. The peripherals 164 may also include additional storage, including RAM storage, solid state storage, or disk storage. The peripherals 164 may include user interface devices such as a display screen, including touch display screens or multitouch display screens, keyboard or other input devices, microphones, speakers, etc. In other embodiments, the system 160 may be any type of computing system (e.g., desktop personal computer, laptop, workstation, video game console, nettop).

It is noted that the above-described embodiments may comprise software. In such an embodiment, program instructions and/or a database (both of which may be referred to as "instructions") that represent the described systems, components, and/or methods may be stored on a computer readable storage medium. Generally speaking, a computer readable storage medium may include any non-transitory storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory controller comprising a plurality of ports, wherein the memory controller is configured to receive memory requests on each port of the plurality of ports;
   one or more processors coupled to a first port of the plurality of ports of the memory controller; and
   a direct memory access (DMA) controller coupled to a second port of the plurality of ports of the memory controller, and coupled to a third port of at least one of the one or more processors, the second port being different from the first port;
   wherein the DMA controller is coupled to read trace data from the one or more processors via a third port, and convey corresponding trace data to the memory controller via the second port.

2. The apparatus as recited in claim 1, wherein the one or more processors are configured to write trace data to one or more trace buffers, and wherein the DMA controller is configured to read trace data from the one or more trace buffers.

3. The apparatus as recited in claim 1, wherein the memory controller is configured to receive real-time memory requests on the first port, and wherein the memory controller is configured to receive non-real-time memory requests on the second port.

4. The apparatus as recited in claim 3, wherein the memory controller is configured to treat the non-real-time memory requests as having a lower priority than the real-time memory requests.

5. The apparatus as recited in claim 1, wherein the trace data comprises program counters of instructions executed by the one or more processors.

6. The apparatus as recited in claim 1, wherein the apparatus further comprises a bridge device coupled to the one or more processors and the DMA controller, wherein the one or more processors are configured to output the trace data in a format compatible with a first protocol, wherein the bridge device is configured to convert the trace data to a format compatible with a second protocol, and wherein the DMA controller is configured to receive the trace data in a format compatible with the second protocol.

7. The apparatus as recited in claim 6, wherein the first protocol is an advanced peripheral bus (APB) protocol, and wherein the second protocol is an advanced high-performance bus (AHB) protocol.

8. An apparatus comprising:
   a bus interface unit (BIU) comprising a trace buffer;
   a processor configured to write trace data to the trace buffer;
   a direct memory access (DMA) controller configured to read trace data from the trace buffer via a first port; and
   a memory controller coupled to the processor via a second port, and coupled to the DMA controller via a third port, wherein the second port is different from the third port;
   wherein the BIU is configured to:
      monitor a fill level of the trace buffer;
      reduce a frequency of a clock coupled to the processor responsive to detecting the fill level exceeds a first threshold; and
      increase a frequency of the clock responsive to detecting the fill level has fallen below a second threshold.

9. The apparatus as recited in claim 8, wherein the DMA controller is configured to continue reading trace data from the trace buffer after the frequency of the clock is reduced.

10. The apparatus as recited in claim 9, wherein the first port is dedicated for use by the DMA controller to read the trace data.

11. The apparatus as recited in claim 10, wherein the memory controller is configured to receive real-time data on the second port, and wherein the memory controller is configured to receive non-real-time data on the third port.

12. The apparatus as recited in claim 9, wherein the trace data comprises program counters of instructions executed by the one or more processors.

13. The apparatus as recited in claim 9, wherein the trace buffer is a random-access memory (RAM), and wherein the RAM is configured as a first-in first-out (FIFO) queue.

14. A method for use in a computing system, the method comprising:
   generating trace data at one or more processors;
   storing the trace data in one or more trace buffers;
   the one or more processors conveying memory requests to a memory controller via a real-time port;
   a direct memory access (DMA) controller reading the trace data from the one or more trace buffers via a DMA port; and
   writing the trace data from the DMA controller to a non-real-time port of the memory controller, wherein the real-time port is different from the non-real-time port.

15. The method as recited in claim 14, further comprising:
   capturing internal signal data of the one or more processors with an on-chip logic analyzer; and
   storing the internal signal data in the one or more trace buffers, wherein the internal signal data is interleaved with the trace data from one or more processors.

16. The method as recited in claim 14, wherein each processor of the one or more processors is configured to store trace data in a respective trace buffer.

17. The method as recited in claim 14, wherein the DMA controller is located in a non-real-time block of an integrated circuit, and wherein the DMA controller is configured to operate independently of the one or more processors.

18. A system comprising:
   a processor complex comprising one or more processors and a bus interface unit (BIU);
   a non-real-time (NRT) block comprising a direct memory access (DMA) controller; and
   a memory controller comprising a plurality of ports, wherein the memory controller is coupled to the processor complex via a first port of the plurality of ports, and the memory controller is coupled to the non-real-time block via a second port of the plurality of ports, wherein the first port is different from the second port;
   wherein the processor complex is configured to:
      capture trace data corresponding to the one or more processors; and
      store the trace data in one or more trace buffers;
   wherein the DMA controller is configured to:
      read trace data from the one or more trace buffers; and
      write trace data to the memory controller via a non-real-time port of the memory controller.

19. The system as recited in claim 18, wherein the processor complex is configured to access memory via a real-time port of the memory controller.

20. The system as recited in claim 18, wherein the trace data includes data used for debugging the one or more processors of the processor complex.

21. The system as recited in claim 20, wherein the trace data includes program counters of retired instructions and an amount of time elapsed between retired instructions.

\* \* \* \* \*